United States Patent
Lawrence

(10) Patent No.: US 6,240,644 B1
(45) Date of Patent: Jun. 5, 2001

(54) TRIMMER WITH RETRACTABLE EDGER HANDLE

(76) Inventor: Kenneth Lawrence, 15617 SW. 61 Ter., Miami, FL (US) 33193

(*) Notice: Subject to any disclaimer, the term of this patent is extended or adjusted under 35 U.S.C. 154(b) by 0 days.

(21) Appl. No.: 09/479,003

(22) Filed: Jan. 7, 2000

(51) Int. Cl.$^7$ .................................................. A01D 34/68
(52) U.S. Cl. ............................. 30/276; 30/296.1; 172/13; 172/15
(58) Field of Search .................................. 30/276, 275.4, 30/296.1, 312; 56/12.7, 256; 172/13, 14, 15, 41; D8/8

(56) References Cited

U.S. PATENT DOCUMENTS

| | | | |
|---|---|---|---|
| 4,145,810 | * 3/1979 | Belliston | 30/296.1 |
| 4,282,652 | * 8/1981 | Ballas, Sr. | 30/276 |
| 4,364,435 | * 12/1982 | Tuggle et al. | 172/15 |
| 4,442,659 | 4/1984 | Enbusk | 56/12.7 |
| 5,740,613 | * 4/1998 | Swistun et al. | 30/276 |

* cited by examiner

*Primary Examiner*—Hwei-Siu Payer
(74) *Attorney, Agent, or Firm*—J. Sanchelima

(57) ABSTRACT

An improvement for trimmers of the type that include an elongated main handle member with a motor assembly on one end and a cutting head at the other end. A secondary retractable handle member is pivotally mounted at one end to a point on the main handle member that is adjacent to the cutting head so that maximum control can be exerted on the positioning of the latter. The retractable handle member is preferably made to conform to the shape of the main handle member when brought next to it. A securing latch assembly releasably keeps both of them attached to each other when desired by a user, typically, to operate on horizontal cutting planes. The retractable handle member is not separated when a user desires to make vertical cuts.

3 Claims, 2 Drawing Sheets

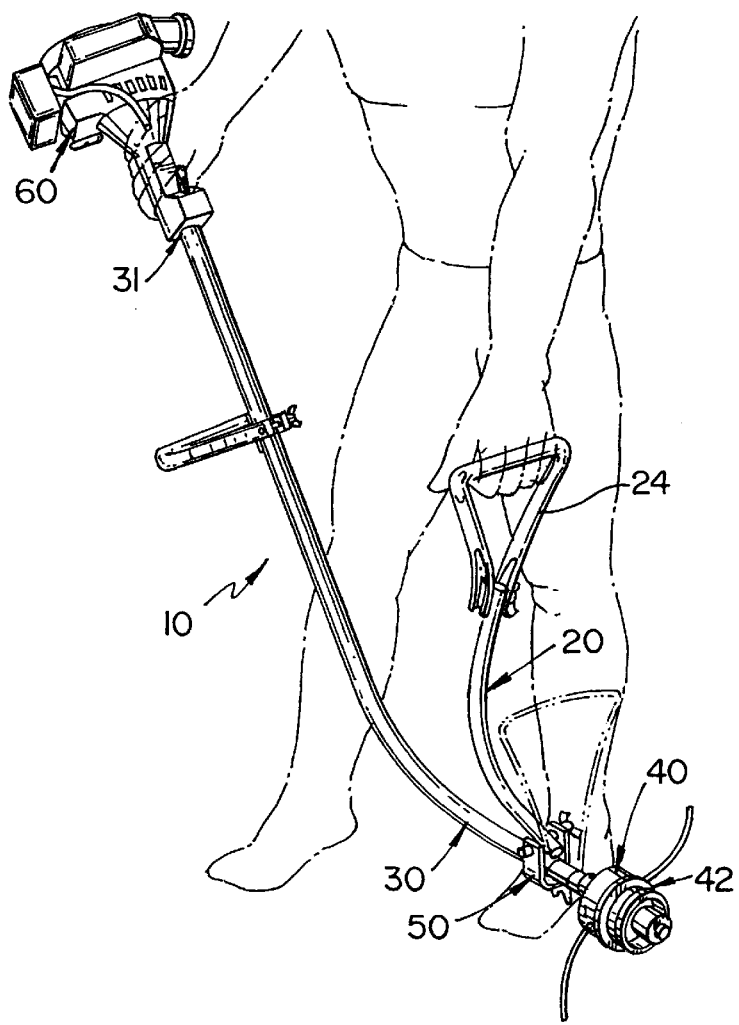
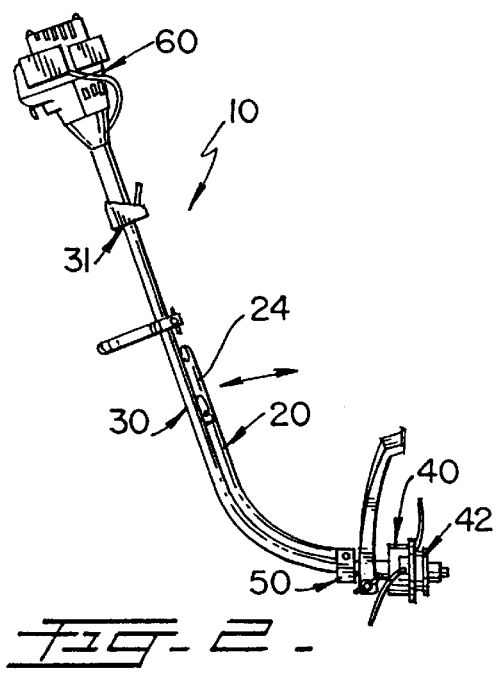
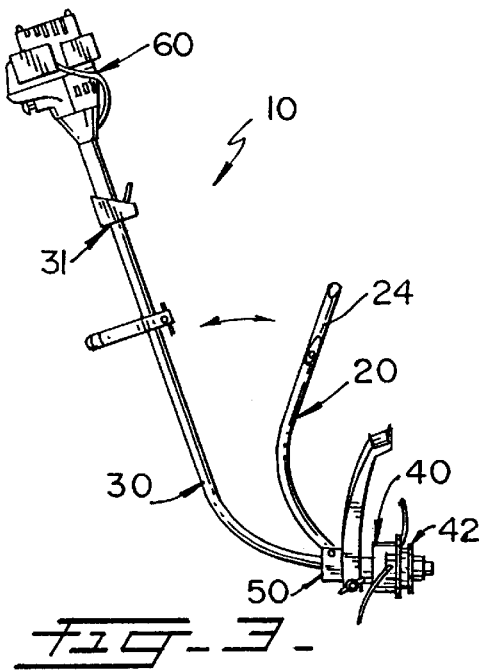

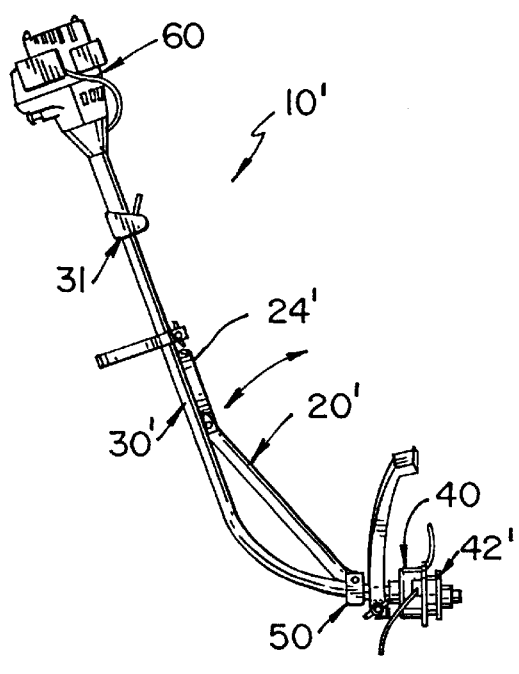
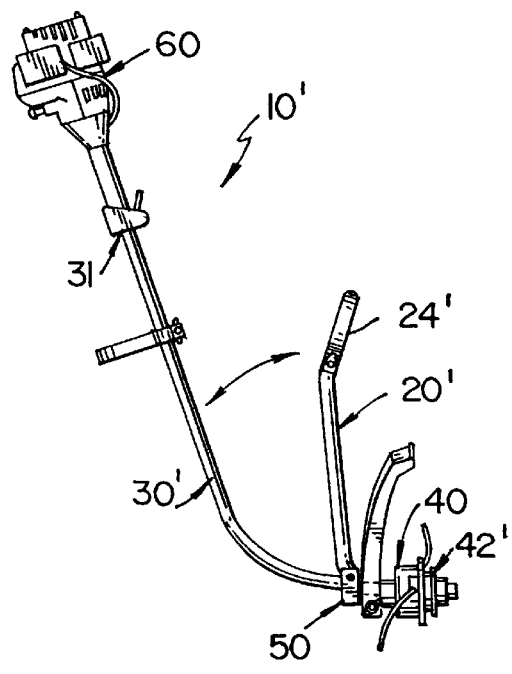

TRIMMER WITH RETRACTABLE EDGER HANDLE

BACKGROUND OF THE INVENTION

1. Field of the Invention

The present invention relates to a trimmer with retractable handle.

2. Description of the Related Art

Many designs for trimmers have been designed in the past. None of them, however, include a retractable handle to allow a user to position the cutting head to operate vertically. Conventional trimmers are designed for the cutting head to operate horizontally and users are forced to hold the trimmer in an uncomfortable position when they desire to make vertical cuts.

Applicant believes that the closest reference corresponds to U.S. Pat. No. 4,442,659 issued to Enbusk. However, it differs from the present invention because Enbusk's patent shows a very complicated mechanism to obtain the vertical position of the cutting head.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a trimmer that can be readily handled to operate on horizontal and vertical planes.

It is another object of this invention to provide a trimmer that can be implement by modifying conventional edgers.

It is still another object of the present invention to provide a trimmer that is volumetrically efficient for transportation and storage.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a front elevational view of the trimmer with the retractable handle being held by a user (in phantom) operating in a vertical plane.

FIG. 2 shows a front elevational view of the trimmer with the handle in the retracted position.

FIG. 3 illustrates a front elevational view of the trimmer with the handle shown in the vertical position.

FIG. 4 shows a front elevational view of the trimmer with an alternate embodiment for the handle in the retracted position.

FIG. 5 illustrates a front elevational view of the trimmer with the alternate embodiment for the handle shown in the vertical position.

DETAILED DESCRIPTION OF THE PREFERRED EMBODIMENT

Referring now to the drawings, where the present invention is generally referred to with numeral 10, it can be observed that it basically includes a retractable handle member 20 that conforms to the main handle 30 of an edger assembly 40, in one of the preferred embodiments.

Edger assembly 40 includes cutting head 42 at one end of main handle member 30. Retractable handle member 20 is hingedly mounted at one end to a point on main handle member 30 adjacent to cutting head 42, as seen in FIG. 1.

Edger assembly 40 includes main handle member 30 that has a curved shape next to cutting head 42. In the preferred embodiment, retractable handle member 20 conforms to the contour of main handle member 30, when brought next to it (retracted position), as shown in FIG. 2. When handle member 20 is separated from main handle member 30, as best seen in FIG. 3, a curved angle is defined by these two members between 250550, depending on the constitution of the user. The distal end of handle member 20 includes a grip portion 24.

When utilized for the purpose for which it was designed, trimmer 10 functions as a weed eater edger, making horizontal cuts. When used to make horizontal cuts, handle member 20 is retracted against main handle member 30 and releasably kept in place by latch assembly 50, when is mounted to main handle member 30. When a user desires to make vertical cuts, he/she grabs grip portion 24 separating handle member 20 from main handle member 30 and rotating main handle member 30. The user comfortably holds grip portion 24 with one hand and end 31 of main handle member 30 with the other hand at a position adjacent to motor assembly 60. By having the end that is hingedly mounted to handle member 30 close to cutting head 42, a user can effectively control the position of latter.

An alternate embodiment is shown in FIGS. 4 and 5 as 10' wherein a straight retractable member 20' is used with grip portion 24' at the distal end. While member 20' does not conform to the shape of main handle member 30', it nevertheless has the advantage of more direct control over the position of head 42'. Or at least, this has been the preference of some users.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An improved trimmer apparatus, comprising;
   A) an elongated first handle member having first and second ends, said first end including motor means for imparting rotational movement to an axle and said second end including a cutting head driven by said motor means through said first handle member and said second end having an arched shape;
   B) an elongated second handle member having third and fourth ends, said third end being hingedly mounted to said first handle member at a position adjacent to said cutting head, and said fourth end includes a grip portion; and
   C) latching means for releasably holding said second handle member against said first handle member.

2. The improved trimmer set forth in claim 1 wherein said first handle member has an arched shape.

3. The improved trimmer set forth in claim 2 wherein said first and second handle members include similar arched shapes so that when said first and second handle members are brought together they conform to each other.

* * * * *